(12) United States Patent
Basir

(10) Patent No.: US 9,562,776 B2
(45) Date of Patent: Feb. 7, 2017

(54) LOCATION-BASED SECURITY

(71) Applicant: Intelligent Mechatronic Systems Inc., Waterloo (CA)

(72) Inventor: Otman A Basir, Waterloo (CA)

(73) Assignee: Intelligent Mechatronic Systems Inc., Waterloo, Ontario (CA)

( * ) Notice: Subject to any disclaimer, the term of this patent is extended or adjusted under 35 U.S.C. 154(b) by 0 days.

(21) Appl. No.: 14/260,261

(22) Filed: Apr. 23, 2014

(65) Prior Publication Data

US 2015/0019131 A1 Jan. 15, 2015

Related U.S. Application Data

(60) Provisional application No. 61/814,932, filed on Apr. 23, 2013.

(51) Int. Cl.
*G01C 21/26* (2006.01)
*B60R 25/24* (2013.01)

(52) U.S. Cl.
CPC .............. *G01C 21/26* (2013.01); *B60R 25/24* (2013.01)

(58) Field of Classification Search
CPC ............. G01C 21/26; G08B 1/08; G06F 7/00; G05D 1/00; B60R 25/01; B60R 25/10
USPC ......................................... 701/526
See application file for complete search history.

(56) References Cited

U.S. PATENT DOCUMENTS

| | | | |
|---|---|---|---|
| 7,911,337 B2 * | 3/2011 | King et al. ............... | 340/539.21 |
| 8,319,605 B2 | 11/2012 | Hassan et al. | |
| 8,442,719 B1 * | 5/2013 | Nowottnick .................... | 701/36 |
| 8,682,541 B2 * | 3/2014 | Best et al. ...................... | 701/50 |
| 8,706,143 B1 | 4/2014 | Elias | |
| 8,918,230 B2 * | 12/2014 | Chen et al. ....................... | 701/2 |
| 8,948,930 B2 * | 2/2015 | Leinfelder ......................... | 701/2 |
| 8,970,363 B2 * | 3/2015 | Kraimer et al. ........... | 340/539.1 |
| 9,070,168 B2 | 6/2015 | Amigo et al. | |
| 9,142,142 B2 | 9/2015 | Nath et al. | |
| 9,200,906 B1 | 12/2015 | Katsman | |
| 2010/0131304 A1 | 5/2010 | Collopy et al. | |
| 2012/0268242 A1 | 10/2012 | Tieman et al. | |
| 2013/0006674 A1 | 1/2013 | Bowne et al. | |
| 2014/0028440 A1 | 1/2014 | Takeuchi et al. | |
| 2014/0113619 A1 | 4/2014 | Tibbitts et al. | |
| 2014/0330596 A1 | 11/2014 | Depura et al. | |
| 2014/0365030 A1 | 12/2014 | Stacy | |
| 2015/0120336 A1 | 4/2015 | Grokop et al. | |
| 2015/0170436 A1 | 6/2015 | Stacy | |

(Continued)

FOREIGN PATENT DOCUMENTS

| | | |
|---|---|---|
| WO | 2012080741 A1 | 6/2012 |
| WO | 2015134339 A1 | 9/2015 |

*Primary Examiner* — Richard Camby

(74) *Attorney, Agent, or Firm* — Carlson, Gaskey & Olds, P.C.

(57) ABSTRACT

In one disclosed embodiment, a portable user-carried device includes wireless communication circuitry capable of determining a relative direction of a wireless signal in a vehicle. A processor may be programmed to determine a location of the device within a vehicle based upon the relative direction of the wireless signal as determined by the wireless communication circuitry. In a disclosed method for activating a function in a vehicle, a state of a user-carried portable device is determined. A function is activated based upon the state of the user-carried portable device.

13 Claims, 2 Drawing Sheets

(56) References Cited

U.S. PATENT DOCUMENTS

2015/0213656 A1 7/2015 Stacy
2016/0016590 A1 1/2016 Fernandez Pozo et al.

* cited by examiner

LOCATION-BASED SECURITY

BACKGROUND

There are existing proximity systems that use RF to determine proximity. With RF based devices it is hard to determine intent and movement with respect to vehicle. One cannot determine if the user is leaving or approaching the car.

RF based triggers are wireless switches to turn certain behavior when pressed by the user (it is on/off, and the user needs to press the right key to trigger a behavior). If the user is far away nothing happens due to signal attenuation.

SUMMARY

One of the disclosed systems and methods uses on-board gps device and GPS on mobile device to deduce proximity, by processing relative position information. As such RF attenuation, occlusion, will not be an issue. So if it is known that the user is approaching the car, the engine may be started, and once it is known that the user is very close, the door is unlocked based on relative gps location and not RF signal strength. The lights can be turned on if it is dark and the user is close but not close enough for the RF to work. Also, a key fob does not need to be pressed because the vicinity of the two device positions will trigger an action without pressing a key fob.

By using relative positioning one can determine how far the user is from the car, this can allow the car to know that the user is moving away and instead of turning the lights off based on time, it turns them based on proximity, saving power.

Another important point, by knowing the user's GPS proximity certain things can be conditioned to setup depending how far the user is from the car. For example, heating the seat can begin when the user is 100 meters away, launch software 50 meters away, and seat 5 meters away.

In that embodiment, distance is no longer a barrier. Many modes of behavior can be defined based on distance. As a matter of fact, it can be programmed, such that, for example, if the user is behind the car do something, if the user is beside the car do something else, and so on. This is not possible with RF triggers that are either on or off These and other features of the application can be best understood from the following specification and drawings, the following of which is a brief description.

BRIEF DESCRIPTION OF PREFERRED EMBODIMENTS

DETAILED DESCRIPTION OF A PREFERRED EMBODIMENT

Figure 1:
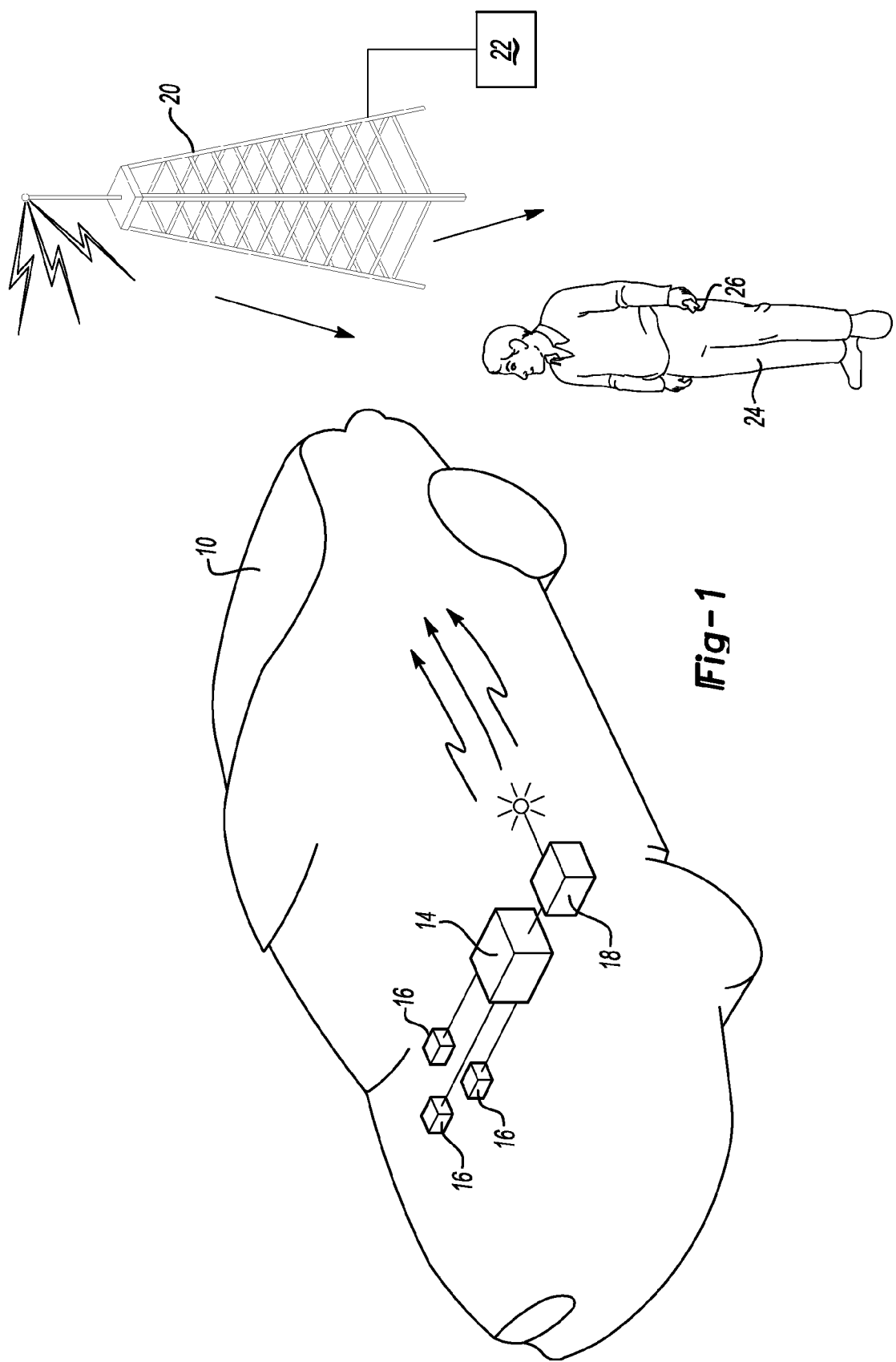
FIG. 1 is a schematic of a system according to one embodiment of the present invention.
Figure 2:
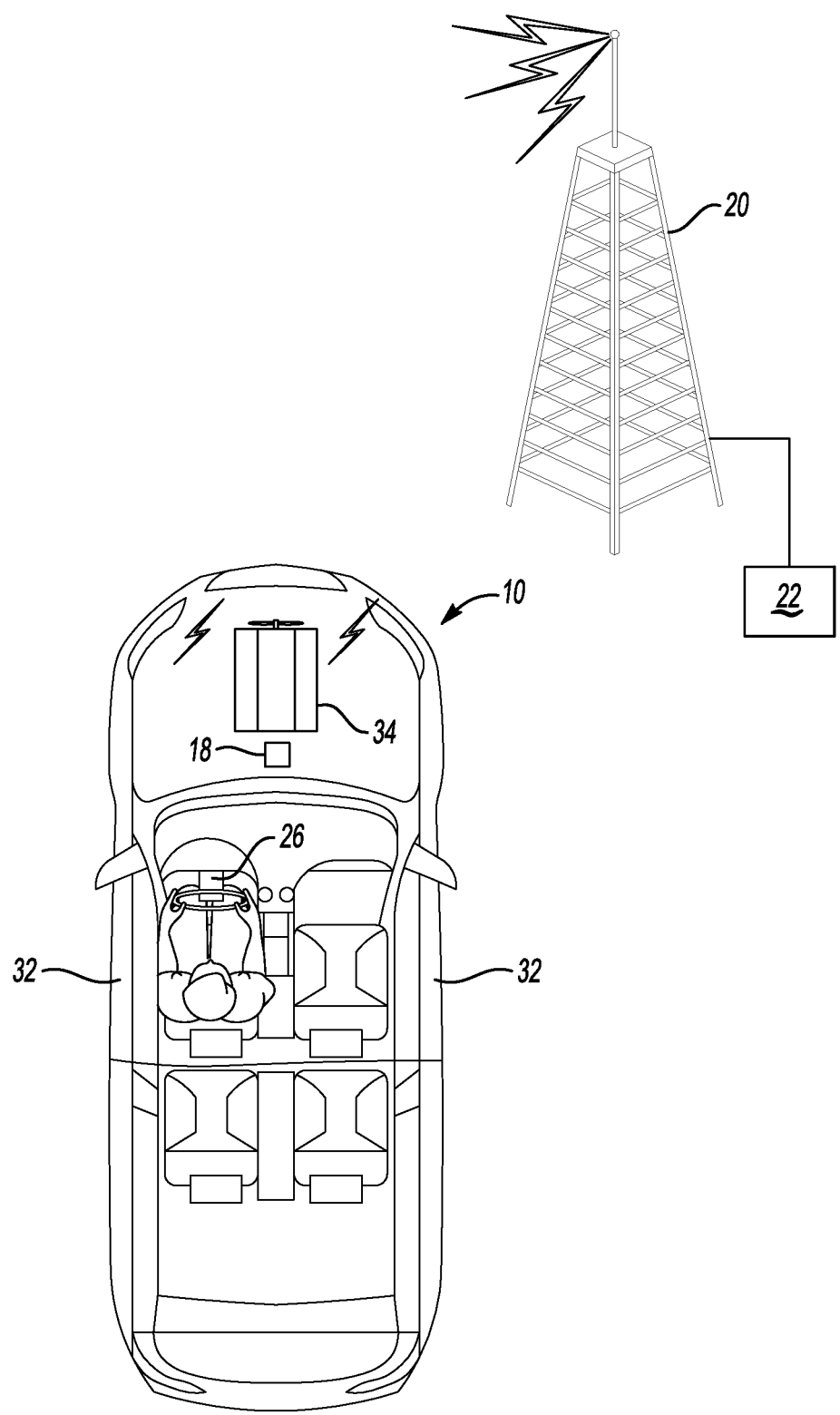
FIG. 2 is a schematic of a second system according to another embodiment of the present invention.

FIG. 1 schematically shows a user-vehicle system including a vehicle 10 including a telematic device 18 having a controller 14 connected to a plurality of monitoring devices 16. As appreciated, the monitoring devices 16 can include any monitors or sensors that are currently utilized and known in the art to monitor vehicle operating performance functions. Such monitoring devices could include sensors such as accelerometers, gyroscopes, and/or an electronic compass that indicates vehicle direction, other sensors that provide information indicative of engine operations such as engine speed sensor, oil pressure, and other data that are relevant and indicative of the overall health and operational capabilities of the vehicle 10 could also relay information to the controller 14 for subsequent transmission by the telematic device 18. The monitoring devices 16 may include a gps receiver.

The telematics device 18 exchanges information through a wide area network 20 with a server 22. The controller 14 and server 22 may each include a processor (which may include more than one physical processor), memory and appropriate computer storage and are programmed to perform the functions described herein.

The user 24 carries a portable electronic device 26, such as a phone, such as a smartphone 26 having at least one processor, memory, storage and is suitably programmed to perform the functions described herein. The portable electronic device 26 also includes cell communication circuitry (voice and data, such as LTE), a gps receiver, local wireless communication circuitry (e.g. wi-fi and Bluetooth), accelerometer, and gyro. For example, the portable electronic device 26 may be an iPhone, such as an iPhone 5s. The portable electronic device 26 exchanges information with the server 22 via the wide area network 20 (or via a separate network), such as via the cell communication circuitry.

First, the system may determine the state of a person with respect to one of the following states:
1. the person is walking
2. the person is running
3. the person is approaching a vehicle
4. the person is inside the vehicle
5. the person is in a stationary vehicle
6. the person is in a moving vehicle
7. the person is leaving a vehicle
8. the person is the driver of a vehicle
9. the person is a passenger of a vehicle
10. the person is a passenger in a bus
11. the person is a passenger in a train
12. the person is riding a bicycle
13. the person is riding a motorcycle The determination of the state of the person with respect to the states is accomplished by using information obtained from one or a combination of the following measurements:

1. This state is detected based on correlating/matching the motion of the person's device 26 (e.g. smartphone with accelerometer, gyro and/or gps) and typical walking motions.

2. This state is detected based on correlating/matching the motion of the person's device 26 and typical running motions.

3. The state of the person being approaching a vehicle is determined using one of the following methods of analysis:

a. by comparing the geographical (e.g gps) motion path, as measured by the device 26 such as by the GPS receiver in the device 26, to the known geographical location of the vehicle. If it is determined that the distance between the position of the person on the motion path is consistently diminishing and that the distance is below a certain threshold then it is determined that the person is approaching the vehicle.

The location of the vehicle 10 is determined based on analyzing the motion of the vehicle 10 until it comes to a complete stop, and or, door open, engine off. This vehicle state detection can also be determined based on reading from a locating system either on board or from a device 26 such as a smartphone being carried by a person riding the vehicle 10. In this case the motion of either locations as one either one or both vary in time and then one or both come to a stop is taken to indicate the vehicle has come to a stop.

Another way, is by measuring changes in the distance or the signal strength between the person and the vehicle 10 based on RF signals (signal strength, time of travel, and angle of arrival) transmitted by the on-board device 18 to the device 26 carried by the person; or transmitted by the device 26 carried by the person to the on-board device 18.

4. The state of the person is being inside the vehicle is determined based on deducing the one or a combination of: the person was approaching the vehicle 10 and came to a stop, approaching the vehicle 10 and a vehicle door open event, the distance between the person's device and the onboard device is less than a certain threshold, the motion of the person's device 26 is highly correlated to that of the onboard device 18, and/or the person's device's 26 location is very close to that of the vehicle 10. In addition, the start of an engine after an approaching state can also be used as indicating the person is in the vehicle 10.

5. A person in a stationary vehicle state is determined by detecting convergence (location proximity) between the location of the vehicle 10 and that of the person and that the locations are not changing. The presence of the person in the vehicle 10 can also be deduced based on measuring the attributes of the signal transmitted between the person's device 26 and the vehicle's onboard device 18.

6. The person is in a moving vehicle state can be determined by analyzing correlation between the location/motion profile of the vehicle 10 (based upon the on-board device 18) and that of the person (based upon the device 26). In this state the two profiles are expected to be highly correlated with respect to location, speed, and acceleration. The locations are reported by the telematics device 18 and the portable device 26 to the server 22 the locations/motion profiles of the telematics device 18 and the portable device 26 and may be compared by the server 22.

7. The state of the person leaving the vehicle is based on detecting divergence between the person's location and that of the vehicle (via the device 26 and the device 18, respectively), and/or based on the strength of the signal measuring changes in the distance or the signal strength between the person and the vehicle based on RF signals (signal strength, time of travel, and angle of arrival) transmitted by the on-board device to a device carried by the person; or transmitted by the device carried by the person to the on-board device. In addition divergence of the motion paths of the vehicle 10 and that of the person (measured by a device 26) can be used to deduce that the person is leaving the vehicle 10; and/or changes measured in the magnetic fields around the person's device 26.

8. The state of the person being the driver is determined based on analyzing the magnetic field around the person and matching that with RF signal fingerprint in the vehicle 10. Any of the antennae in the device 26 can be used to "listen" to the surround magnetic field and compare it to a known signal fingerprint for different locations in the vehicle. For example, cell communication circuitry (e.g. LTE or other beam-forming technology) can also discern the relative direction of surround RF and/or magnetic signals. In this manner, the RF noise generated by the running engine 34 gives one reference location point in the vehicle. The effect of the metal in the door 32 on ambient RF signals (including LTE signals or other signals from cell towers or satellite signals) can also be detected to determine the relative location of the door. For example, is the proximate door 32 to the left of the device 26 or is the proximate door to the right of the device 26? The state of the user being the driver can also be accomplished by correlating the acceleration profile of the person's device 26 and that of the vehicle 10 (obtained from the vehicle's accelerometer and/or from an on-board device 18 accelerometer). This state can also be deduced by analyzing the angles at which the person's hand approaches the person device 26 while in the car 10. This can also be deduced from measuring the time it takes the person to reach out to the person's device 26. This analysis takes in consideration the motion of the vehicle 10. For example, a driver takes longer to reach out to his/her device 26 (smartphone) and tends to approach the phone right-to-left (or vice versa depending on driving system right-side vs left-side steering wheels).

9. The state of the person being the passenger (i.e., not the driver) is determined based on analyzing the magnetic field around the person and matching that with RF signal fingerprint in the vehicle. For example, cell communication circuitry (e.g. LTE) can also discern the relative direction of surround RF and/or magnetic signals. In this manner, the RF noise generated by the running engine gives one reference location point in the vehicle. The effect of the metal in the door on ambient RF signals (including LTE signals or other signals from cell towers or satellite signals) can also be detected to determine the relative location of the door. For example, is the door to the left of the device 26 or the door to the right of the device 26? This can also be accomplished by correlating the acceleration profile of the person's device and that of the vehicle (obtained from the vehicle's accelerometer, or from an on-board device accelerometer). This state can also be deduced by analyzing the angles at which the person's hand approaches the person device while in the car. This can also be deduced from measuring the time it takes the person to reach out to the person's device. This analysis takes in consideration the motion of the vehicle. For example, a driver takes longer to reach out to his/her device (smartphone) and tends to approach the phone right-to-left (or vice versa depending on driving system right-side vs left-side steering wheels).

10. The state of being in a bus can be determined based on analyzing sound signals collected inside the vehicle. Theses sound signals constitute of crowd noise, engine noise, track noise, etc. Detection of a crowd and a motion of a vehicle (not a person walking motion) signify a bus or train. However, train motion profiles and sounds can be different from bus motion sounds (train engine and tracks) and motion profiles.

11. The state of being in a train can be determined based on analyzing sound signals collected inside the vehicle. Theses sound signals constitute of crowd noise, engine noise, track noise, etc. Detection of a crowd and a motion that is consistent with vehicle motion profile (not a person walking motion) signifies a bus or train. However, train motion profiles and sounds can be different from bus motion sounds (train engine and tracks) and motion profiles. Furthermore, analysis and matching motion tracks with train tracks provides another piece of evidence to signify that the person is on a train.

12. Detection of a person is riding a bicycle state can be accomplished by analyzing sound activities in the surrounding of the person. Lack of correlation of sound activities and motion is an indicator of a person riding a bicycle. The motion profile of the motion provides further evidence that the person is riding a bicycle. For example, speed, acceleration and cornering attributes provide indication of bicycle motion.

13. Detection of a person riding a motor cycle can be determined from analyzing the sounds in the vicinity of the person and correlating that with the motion profile. If the sound activity in terms of phase and amplitude is correlated with the motion attributes of the person's device then it is determined that the person is riding a motorcycle.

Tasks and actions that can be triggered based on detection of the detected states:

1. switching smartphone from vehicle mode (integrating with in-vehicle system, such as iLane®) to out-of-vehicle (i.e. self-contained) mode.
2. Activating (or deactivating) voice based smartphone interaction on detection of approaching/leaving states.
3. Switching on vehicle lights based an approaching state or off on leaving vehicle
4. Unlocking vehicle doors based on detection of an approaching state and locking them based on detection of a leaving state
5. Turning environmental conditioning on off based on approaching/leaving state.
6. Turning voice interaction off in bus or train state.
7. Applying proper filtering based on detection of bus vs train vs bicycle and motor cycle.
8. Reporting trip information to a remote center
9. Activating vehicle antitheft features based on state detection (approaching/leaving)
10. Deactivating voice based interaction based on passenger in the vehicle state detection
11. Managing smartphone modes of operation (voice interaction, call blocking, call forwarding, etc) based on person in stationary/moving vehicle states.
12. Generating alerts to inform other parties that the person left the vehicle or just came to the vehicle or in the vehicle.
13. Triggering billing process and or terminating a billing process based on detection of the person approached or left the car. This can be accomplished by conditioning this process by location specificity, for example, only if vehicle is on car rental lot.
14. Triggering engine ignition or engine shutting based on approaching/leaving states detection.
15. Adjusting vehicle setup such as seats and mirrors etc based on detection of approaching state
16. Triggering vehicle sound or lights to alert the driver its location based on approaching. This triggering can be such that alerts are triggered first followed by door unlock.
17. Triggering vehicle sound or lights to confirm that it locked its doors and engine, etc based on leaving state.

In approach and leaving states the user can adjust the triggering parameters in terms of minimum distance to trigger a certain function.

The in-vehicle system will be programmed remotely by a server to allow an operator use his phone send messages/commands via short wireless range link or via a wireless network such as GPRS/LTE/CDMA/ect or satellite communication. This allows the user to his his/her cellphone to control vehicle functions such as car door lock/unlock, interior lights, exterior lights, engine remotely. The enablement of remote control of certain functions can be conditioned as a function of the relative position of the user from the vehicle. For example, it is possible to allow door/luck or unlock only if the user's cellphone is less than 10 meters away from the car. It is also possible to adjust these conditions as a function of location. For example, some commands are enabled only if the car is located at home or at work. When a smartphone sends a control message to the vehicle, the in-vehicle unit will confirm the authenticity of the smartphone for example by checking the cellphone number or its device id no against the list of permitted or registered users. Every time the car will transmit to the remote server a report of activities, success or failure.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A portable user-carried device including:
   wireless communication circuitry capable of determining a relative direction of a wireless signal in a vehicle; and
   a processor programmed to determine a relative location of the device within a vehicle relative to multiple locations in the interior of the vehicle based upon the relative direction of the wireless signal as determined by the wireless communication circuitry, wherein the portable user-carried device is a smartphone and wherein the wireless communication circuitry and the processor are components of the smartphone.

2. A method for activating a function in a vehicle including the steps of:
   a) based upon ambient RF signals, determining whether a user carrying a user-carried portable device is in a driver seat of a vehicle or whether the user is in a passenger seat of the vehicle; and
   b) activating the function based upon the state of the user-carried portable device.

3. The method of claim 2 wherein said step a) includes the step of determining that the user of the user-carried portable device is in the driver seat of the vehicle.

4. The method of claim 2 wherein said step a) includes the step of determining that the user of the user-carried portable device is in the passenger seat of the vehicle.

5. The method of claim 2 wherein said step a) is based upon ambient sound.

6. The method of 2 wherein said step of determining in said step a) is based upon a gps-determined location of the user-carried mobile device.

7. The method of claim 2 wherein said step a) is based upon a location of the user-carried mobile device and based upon a location of the vehicle.

8. The device of claim 1 wherein the processor can determine whether the device is in a driver's seat of the vehicle.

9. The device of claim 8 wherein the processor can determine whether the device is in a passenger seat of the vehicle.

10. The device of claim 1 wherein the wireless signal is ambient noise in the vehicle.

11. The device of claim 1 wherein the wireless signal includes ambient RF signals in the vehicle.

12. The device of claim 11 wherein the ambient RF signals are generated by a running engine of the vehicle.

13. The method of claim 2 wherein the ambient RF signals are generated by a running engine of the vehicle.

* * * * *

UNITED STATES PATENT AND TRADEMARK OFFICE
CERTIFICATE OF CORRECTION

PATENT NO. : 9,562,776 B2
APPLICATION NO. : 14/260261
DATED : February 7, 2017
INVENTOR(S) : Otman A. Basir It is certified that error appears in the above-identified patent and that said Letters Patent is hereby corrected as shown below:

In the Claims

In Claim 1, Column 6, Line 22; before "interior" replace "the" with --an--

In Claim 2, Column 6, Line 34; after "based upon" replace "the" with --a--

In Claim 6, Column 6, Line 46; before "device" replace "mobile" with --portable--

In Claim 7, Column 6, Line 48; before "device" replace "mobile" with --portable--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*